(12) United States Patent
Mehta et al.

(10) Patent No.: US 8,779,073 B2
(45) Date of Patent: Jul. 15, 2014

(54) ENGINEERING RESIN THERMOPLASTIC SILICONE VULCANIZATES

(76) Inventors: Veerag Mehta, Plainsboro, NJ (US); David Romanesko, Midland, MI (US)

( * ) Notice: Subject to any disclaimer, the term of this patent is extended or adjusted under 35 U.S.C. 154(b) by 700 days.

(21) Appl. No.: 12/925,786

(22) Filed: Oct. 29, 2010

(65) Prior Publication Data

US 2011/0046265 A1 Feb. 24, 2011

Related U.S. Application Data

(63) Continuation of application No. 11/982,047, filed on Nov. 1, 2007, now abandoned.

(51) Int. Cl.
| | | |
|---|---|---|
| *C08L 83/04* | (2006.01) | |
| *C08L 67/00* | (2006.01) | |
| *C08K 3/00* | (2006.01) | |
| *C08G 77/20* | (2006.01) | |

(52) U.S. Cl.
CPC ............. *C08K 3/0033* (2013.01); *C08L 83/04* (2013.01); *C08G 77/20* (2013.01)
USPC ........... 525/474; 525/100; 525/393; 525/431; 525/446; 524/101; 524/127; 524/287; 524/288; 524/294; 524/295; 524/316; 524/341; 524/342; 524/430; 528/24; 528/32

(58) Field of Classification Search
None
See application file for complete search history.

(56) References Cited

U.S. PATENT DOCUMENTS

| | | |
|---|---|---|
| 3,824,208 A | 7/1974 | Link et al. |
| 5,153,238 A | 10/1992 | Bilgrien et al. |
| 5,391,594 A | 2/1995 | Romenesko et al. |
| 5,288,674 A | 4/1996 | Romenesko |
| 5,508,323 A | 4/1996 | Romenesko |
| 5,916,952 A | 6/1999 | Romenesko |
| 6,362,288 B1 | 3/2002 | Brewer et al. |
| 6,417,293 B1 | 7/2002 | Chorvath et al. |
| 6,465,552 B1 * | 10/2002 | Chorvath et al. ............. 524/323 |
| 6,569,958 B1 | 5/2003 | Gross et al. |
| 6,649,704 B2 | 11/2003 | Brewer et al. |
| 6,759,487 B2 | 7/2004 | Gornowicz et al. |

* cited by examiner

*Primary Examiner* — Marc Zimmer

(57) ABSTRACT

A method for preparing a modified thermoplastic resin by mixing a thermoplastic resin having a $t_g$ of 95° C. or greater and having a melt processing temperature of 250° C. or greater with a silicone base comprised of 100 parts by weight of a diorganopolysiloxane gum and having an average of at least 2 alkenyl groups per molecule in conjunction with 0 to 50 parts by weight of a reinforcing filler along with a radical initiator. The silicone base and this combination are dynamically vulcanized to cure the silicone base at an elevated temperature.

18 Claims, No Drawings

ENGINEERING RESIN THERMOPLASTIC SILICONE VULCANIZATES

This invention relates to the modification of certain engineering thermoplastics using silicone rubbers. This application is a continuation of U.S. Ser. No. 11/982,047, filed Nov. 1, 2007 from which priority is claimed.

BACKGROUND OF THE INVENTION

The advent of stable, silicone rubbers started in the U.S. during the 1970's, but gained strength on new polydiorganosiloxane powered rubbers during the 1990's and this has led to new plastics modified with the modern silicone rubbers that have found use in such things as component parts for aircraft and trains, cookware, automobile components, machine parts, cabinetry and casing for electronic and computer systems, designed office and home furniture, and the like.

The provision of modern silicone rubbers came primarily from the inventors of the inventions found in U.S. Pat. No. 5,153,238, that issued on Oct. 6, 1992 to Bilgrien, et al; U.S. Pat. No. 3,824,208 that issued on Jul. 16, 1974 to Link et al, and U.S. Pat. No. 5,391,594 that issued on Feb. 21, 1995 to Romenesko, et al, in which free-flowing silicone polymer powders are taught. Said powders have an average particle size of 1 to 1000 microns and are prepared by mixing a polydiorganosiloxane with reinforcing silica filler.

It is taught by Romenesko in the '594 patent that when these powdered polymers are employed at a concentration of about 0.5 to 25 parts by weight of powder per 100 parts by weight of resin, significant improvement in the burn character of the modified resin is obtained such that the rate of heat release, generation of smoke and evolution of toxic carbon monoxide gas is significantly reduced relative to the unmodified resin.

For example, modification of thermoplastic resins has been taught in Romenesko in U.S. Pat. No. 5,288,674 and U.S. Pat. No. 5,508,323 that issued on Apr. 16, 1996, namely, polystyrene, high impact polystyrene, propylene, polycarbonate, polysulfone, poly(phenylene sulfide), acrylonitrile-butadiene-styrene copolymer, nylon, acetal, polyethylene, poly(ethylene terephthalate), poly(butylene terephthalate), acrylate, fluoroplastics, polyesters, phenolics, epoxies, urethanes, polyimides, melamine formaldehyde and urea.

Romenesko et al, in U.S. Pat. No. 5,916,952 discloses the modification of Poly(phenylene ether) resin using powered silicone polymers. Brewer et al, in U.S. Pat. No. 6,362,288 that issued Mar. 26, 2002 discloses the silicone modification of compatibilized polyamide resins. Chorvath et al, in U.S. Pat. No. 6,417,293 that issued Jul. 9, 2002 discloses the silicone modification of polyester resins.

In addition, Chorvath et al disclose thermoplastic silicone modified elastomers (polyamide or polyester resins) using radical cure techniques in U.S. Pat. No. 6,465,552, that issued Oct. 15, 2002 and Gross, et al in U.S. Pat. No. 5,569,958 that issued May 27, 2003 disclosed thermoplastic silicone elastomers from compatibilized polyester resins.

Further, Brewer, et al in U.S. Pat. No. 6,649,704 that issued on Nov. 18, 2003 disclose thermoplastic silicone elastomers from compatibilized polyamide resins and still further, Gornowicz et al, in U.S. Pat. No. 6,759,487 that issued on Jul. 6, 2004 disclose thermoplastic polyurethane silicone elastomers.

These patents teach modification of certain polymers that have $t_g$'s below about 90° C. and processing temperatures of less than 200° C., as these are the polymers that have fairly low complexity of handling. Polymers having $t_g$'s above about 95° C. along with melt processing temperatures at 250° C. or above have not been taught in the prior art nor have the benefits of such compositions been disclosed in the prior art.

THE INVENTION

Thus, what is disclosed and claimed herein is a method for preparing a modified thermoplastic, said method comprising mixing a non-fluorine containing thermoplastic resin selected from the group consisting of (i) a thermoplastic resin having a $t_g$ of 95° C. or greater and having a melt processing temperature of 250° C. or greater with a silicone base comprised of 100 parts by weight of a diorganopolysiloxane gum having a plasticity of at least 30 and having an average of at least 2 alkenyl groups per molecule in conjunction with 0 to 50 parts by weight of a reinforcing filler, wherein the weight ratio of said silicone base to said thermoplastic resin is from 0.5:99.5 to 85:15.

In addition, there is present 0.01 to 5 parts by weight of a radical initiator for every 100 parts by weight of the silicone base, and this combination is dynamically vulcanized to cure the silicone base at an elevated temperature.

"Elevated temperature" for purposes of this invention is at least the melt processing temperature of the thermoplastic resin.

Preferred thermoplastic resins for use in this method are those having a $t_g$ of 95° C. or greater and a melt processing temperature of 250° C. or greater. More preferred are those thermoplastic resins having a $t_g$ of 110° C. or greater.

The preparation of the diorganopolysiloxane bases useful in this invention can be found in U.S. Pat. No. 5,508,323, among others, and the disclosure with regard to this preparation is hereby incorporated by reference for what it teaches about such silicone base preparation.

Also useful in this invention are adhesion additives (also known as coupling agents). Such additives and how they are used are well known in the art. For example, in the '323 patent there is disclosed at column 6, beginning at line 16, a full disclosure of what these materials are and that information is incorporated herein by reference for what it teaches about such adhesion additives and how they are used.

Preferred for this invention is the use of a level of adhesion additive of about 0.5 to about 15 parts by weight for each 100 parts by weight of said silicone rubber powder, the addition being preferably carried out after the polydiorganosiloxane and treated silica filler have been mixed.

The silicas that are useful in this invention are finely divided fillers derived from fumed or precipitated forms, or from silica aerogels. These fillers are well known and are typically characterized by surface areas greater than about 50 m²/gram. The fumed form of silica is the preferred reinforcing filler based on its availability, cost, and high surface area, which can be as high as 900 m²/gram, but preferably has a surface area of 50 to 400 m²/gram. These silicas are also very easy to manufacture and handle. It is contemplated within the scope of this invention to use silicone formulations that do not contain silica filler, or that contain very small amounts of silica filler. Thus, amounts of silica ranging from just above zero parts per 100 parts of the base polymer up to less than 1 part of silica filler can be used.

For purposes of this invention, the silica filler, if used, is preferably treated by reaction with a liquid organosilicon compound containing silanol groups or hydrolyzable precursors of silanol groups. Compounds that can be used as filler treating agents, also referred to as anti-creping agents, include such components as low molecular weight liquid hydroxy- or alkoxy-terminated polydiorganosiloxanes, hexaorganodisiloxanes and hexaorganodisilazanes. The silicon-bonded hydrocarbon radicals in or on a portion of the filler treating agent can contain substituents such as carbon to carbon double bonds. It is preferred that the treating compound is an oligomeric hydroxy-terminated polydimethylsiloxane having an average degree of polymerization (DP) of about 2 to about 100. A highly preferred treating fluid of this type has a DP of about 2 to 10.

The silica filler used in the present method is preferably reacted with about 10 to about 45 weight percent, based on filler weight, of the filler treating agent prior to being blended with the polydiorganosiloxane to form the silicone rubber. Treatment of the filler can be carried out in the same mixing vessel used to prepare the silicone rubber. The silica or other reinforcing filler is typically maintained at a temperature greater than about 100° C. to about 200° C. during the treatment process. Alternatively, the filler can be treated while it is being blended with the high consistency polydiorgano-siloxane during preparation of the silicone rubber.

According to the methods of this invention, the thermoplastic is prepared by thoroughly dispersing the silicone base in the thermoplastic resin and then dynamically vulcanizing the silicone base using either of the methods set forth herein.

For purposes of this invention wherein the method is that of mixing a thermoplastic resin with a silicone gum comprised of an alkenyl-functional silicone that is cured by free radical catalysis, the weight ratio of silicone base to the thermoplastic resin can range from 0.5:99.5 to 85:15, and no hydrogen-containing polysiloxanes need be added.

The radical initiators useful in this invention are any compounds capable of providing free radicals for the subsequent vulcanization of the silicone base. Such radical initiators can be exemplified and selected from the group consisting of (i) 2,2'-azobisisobutyronitrile, (ii) 2,2'-azobis(2-methylbutyronitrile), (iii) dibenzoyl peroxide, (iv) tert-amyl peroxyacetate, (v) 1,4-di(2-tert-butylperoxyisoproyl)benzene, monohydroperoxide, (vi) cumyl hydroperoxide, (vii) tert-butyl hydroperoxide, (viii) tert-amyl hydroperoxide, (ix) 1,1-d (tert-butylperoxy)cyclohexane, (x) tert-butylperoxy isopropyl carbonate, (xi) tert-amyl peroxybenzoate, (xii) dicumyl peroxide, (xiii) 2,5-dimethyl-2,5-di-(tert-butylperoxy)hexane, (xiv) bis(1-methyl-1-phenylethyl)peroxide, (xv) 2,5-dimethyl-2,5-di-(tert-butylperoxy)hexyne-3, (xvi) di-tert-butyl peroxide, (xvii) α,α-dimethylbenzyl hydroperoxide, (xviii) 3,4-dimethyl-3,4-diphenylhexane, (xix) t-butyl hydroperoxide, (xx) t-butyl peroxy O-toluate, (xxi) cyclic peroxy ketal, (xxii) t-butyl peroxypivalate, (xxiii) lauroyl peroxide, (xxiv) t-amyl peroxy-2-ethylhexanoate, (xxv) vinyltris(t-butyl peroxy)silane, (xxvi) di-t-butylperoxide, (xxvii) 2,2,4-trimethylpentyl-2-hydroperoxide, (xxviii) 2,5-bis(t-butylperoxy)-2,5-dimethylhexyne-3, (xxix) t-butyl-peroxy-3,55-trimethylhexanoate, (xxx) cumene hydroperoxide, (xxxi) t-butyl peroxybenzoate, (xxxii) diisopropylbenzene mono hydroperoxide, and (xxxiii) combinations of (i) to (xxxii).

This initiator is used in an amount sufficient to cure diorganopolysiloxane (B) and this amount can be optimized for a given system by those skilled in the art using routine experimentation. When the amount is too low, insufficient crosslinking takes place and mechanical properties suffer accordingly. Optimum performance can be readily determined by a few simple experiments for the system under consideration. Moreover, information can be obtained from the manufacturer with regard to the performance (half-life) of the initiator.

The initiator is preferably added in the amount of 0.01 to 5 parts by weight for every 100 parts by weight of the silicone base in method 1. More preferred is an amount of 0.05 to 4 parts for every 100 parts by weight of the silicone base.

The thermoplastics that are useful in this invention are those that have a $t_g$ of 95° C. or greater and a melt processing temperature of 250° C. or greater, and as long as these parameters are satisfied, then the thermoplastic is contemplated within the scope of this invention.

Such resins can be exemplified by non-fluorine containing: Liquid Crystal Polymers, Polysulfone, Polyphenylsulfone, Polyethersulfone, Polyetherketone, Polyether-etherketone, Polyetherketoneketone, Polyethylenenaphthalate, Polyether-block-amide, Polyether-block-copolyamid, Polyether-block-copolymer, Polyester-block-ether, Polyester-block-copolymer, Polyphenylene ether, Polyphthalamide, Polyarylamid, Polyimide, Polyamideimide, Polyethernitrile, Polycyclohexylene-dimethylene terephthalate, PCTA, and ASA.

The mixing is carried out in a twin-screw extruder wherein the resin is fed to the extruder through a hopper and the other components are introduced into the extruder along the way, with the radical catalyst preferably being added with the silicone rubber, or separately fed in at a location away from the silicone rubber feed. In a variation of this procedure, the non-reinforcing filler is introduced along with the resin through the hopper. Silicone reinforcing filler may be added after silicone gum is pumped into the extruder. Preferably, the extruder size is sufficient to accomplish the mixing and curing in one pass.

Also contemplated within the scope of this invention is the use of fire retardant additives to provide fire retardancy to the compositions of this invention. Traditional fire retardants can be used herein and can be selected from the group consisting of halogenated varieties such as polydibromostyrene, copolymers of dibromostyrene, polybromostyrene, brominated polystyrene, tetrabromophthalate esters, tetrabromophthalate diol, tetrabromophthalate anhydride, tetrabromobenzoate ester, hexabromocyclododecane, tetrabromobisphenol A, tetrabromobisphenol A bis(2,3-dibromopropyl ether), tetrabromobisphenol A bis(allyl ether), phenoxy-terminated carbonate oligomer of tetrabromobisphenol A, decabromodiphenylethane, decabromodiphenyl oxide, bis-(tribromophenoxyl)ethane, ethane-1,2-bis(pentabromophenyl), tetradecabromodiphenoxybenzene, ethylenebistetrabromophthalimide, ammonium bromide, poly pentabromobenzyl acrylate, brominated epoxy polymer, brominated epoxy oligomer, and brominated epoxies. Other, non-halogen varieties can be selected from such materials as triaryl phosphates isopropylated, cresyl diphenyl phosphate, tricresyl phosphate, trixylxl phosphate, triphenylphosphate, triaryl phosphates butylated, resorcinol bis-(diphenyl phosphate), bisphenol A bis(diphenyl phosphate), melamine phosphate, melamine pyrophosphate, melamine polyphosphate, dimelamine phosphate, melamine, melamine cyanurate, magnesium hydroxide, antimony trioxide, red phosphorous, zinc borate, and zinc stanate.

It is known by those skilled in the art with regard to how much of the fire retardant can be added to give the required effect. Those amounts are also useful herein.

EXAMPLES

The extruder used in these examples was a Werner & Pfleiderer ZSK25, a 25 mm co-rotating twin screw extruder. All materials percentages are given in weight %. Test specimens of Type A tensile bars and ⅛" flex bars were prepared by injection molding on a Boy 30 ton injection molding press. Testing of the tensile bars was done in accordance with ASTM D792.

The following materials were employed in the examples set forth herein.

BASE 1 is a silicone rubber base produced by CRI-SIL, Silicone Technologies, LLC, Biddeford, Me. and is designated as FG 0733 BASE. This material is a stabilized base that is peroxide curable to 50 Durometer. Into this base was blended 4 parts per hundred of tert-Butyl hydroperoxide that is marketed by Akzo Nobel Polymer Chemicals, Burt, N.Y., under the name of Triganox A-W70. All bases are pumped into the extruder in the first zone for all experiments.

BASE 2 is the same as BASE 1 with only 2 parts of a tert-Butyl hydroperoxide. BASE 2 was created by blending a base similar to BASE 1 but without the peroxide in it at a 50/50 BASE 1 ratio.

BASE 3 is the same as BASE 1 with only 1 part of tert-Butyl hydroperoxide. BASE 3 was created by blending a base similar to BASE 1 but without the peroxide in it at a 75/25 BASE 1 ratio.

BASE 4 is the same as BASE 1 with only 0.4 parts of a tert-Butyl hydroperoxide. BASE 4 was created by blending a base similar to BASE 1 but without the peroxide in it at a 90/10 BASE 1 ratio.

Filler 1 was Wollastonite marketed by NYCO Minerals Inc., Willsboro, N.Y., as NYAD G.

PDMS 1-1 to 4 was made from FG 0733 GUM, being a dimethylvinylsiloxy-terminated dimethyl-methylvinyl siloxane copolymer gum having a Williams plasticity of 140 to 165.

PPE 1 is a poly(phenylene ether) marketed by Asahi Kasai Plastics, as Xyron SA201A.

PPE 2 is a poly(polyphenylene ether) marketed by Asahi Kasai Plastics, as Xyron SA202A.

PES 1 is a hydroxyl terminated poly(ether sulfone) marked by Gharda Polymers USA, Newtown, Pa. under the product name Gafone 3600RP.

PPS 1 is an acid functional poly(phenylene sulfide) marketed by Ticona as Fortran SF3001-0214B1.

Example 1

In this example, Base 1 (18.5%) PPE 2 (71.4%) and Filler 1 (10.1%) were blended using a commercial extruder. The extruder temperatures were set in various zones starting the beginning of the extruder and extending to the right, to 250° C./250/250/275/275/275/275/275/275/275/275/280° C. The extruder RPMs were set to 400 and a rate of 18.5 lb/hr was targeted. The resulting material had a tensile at break of 7550 Psi, elongation at break of 11% and a flex modulus of 290,000 psi.

Example 2

In this example, BASE 1 (20.5%), PPE 2 at (59.7%) and Filler 1 at (19.8%) were blended using a commercial extruder. The extruder temperatures were set in the various zones from left to right to 250° C./250/250/275/275/275/275/275/275/275/275/280° C. The extruder RPMs were set to 400 and a rate of 7.3 lb/hr was targeted. The resulting material had a tensile at break of 4490 psi, elongation at break of 6.1% and a flex modulus of 200,000 psi.

Example 3

In this example, BASE 1 (19.4%) and PES 1 (80.6%) were blended using a commercial extruder. The extruder temperatures were set in the various zones from left to right to 150° C./250/250/275/275/275/275/275/275/275/280° C. The extruder RPMs were set to 400 and a rate of 18.6 lb/hr was targeted. The resulting material had a tensile at break of 6550 psi, elongation at break of 5.8% and a flex modulus of 293,000 psi.

Example 4

In this example BASE 4 (27.15%) and PPS 1 (72.85%) were blended using a commercial extruder. The extruder temperatures were set in the various zones from left to right to 120° C./275/275/275/275/275/275/275/275/275/275/280° C. The extruder RPMs were set to 500 and a rate of 23.5 lb/hr was targeted. The resulting material had a tensile at break of 6000 psi, elongation at break of 18% and a flex modulus of 288,000 psi.

Example 5

This example is provided to show the influence of the silicone base in the modified thermoplastic resins. Formulations are in Table I and the results are in Table II.

TABLE I

| Formulation Number | Crisil Sil Base/ 1% peroxide | % Xyron and type |
|---|---|---|
| 1 | 10% | 90-SA201A |
| 2 | 15% | 85-SA201A |
| 3 | 20% | 80-SA201A |
| 4 | 30% | 70-SA201A |
| 5 | 40% | 60-SA201A |
| 6 | 50% | 50-SA201A |
| 7 | 10% | 90-SA202A |
| 8 | 15% | 85-SA202A |
| 9 | 20% | 80-SA202A |
| 10 | 30% | 70-SA202A |
| 11 | 40% | 60-SA202A |
| 12 | 50% | 50-SA202A |

TABLE II

| Form No. | Stress at yield | Strain at yield | Stress at break | strain at break | Modulus Psi | Stress * Def. Psi | Impact |
|---|---|---|---|---|---|---|---|
| 1 | 9746 | 9.7 | 7196 | 16.0 | 319394 | 11330 | 3.19 |
| 2 | 8330 | 3.6 | 3143 | 8.5 | 290601 | 9847 | 2.58 |
| 3 | — | — | 5251 | 5.7 | 199117 | 4528 | 2.26 |
| 4 | — | — | 3393 | 4.8 | 121922 | 2576 | 1.89 |
| 5 | — | — | 2950 | 4.8 | 107464 | 2553 | 1.60 |
| 6 | no data | — | — | — | no data | — | no data |
| 7 | 9757 | 9.9 | 7554 | 52.4 | 307108 | 10862 | 2.43 |
| 8 | 9189 | 10.0 | 7086 | 50.6 | 301881 | 10657 | 2.52 |
| 9 | 7418 | 9.6 | 7111 | 12.3 | 271191 | 8880 | 2.15 |
| 10 | 5535 | 8.5 | 5234 | 8.5 | 209173 | −1 | 1.70 |
| 11 | 4547 | 8.7 | 4503 | 9.6 | 176918 | 924 | 1.96 |

* Deflection

Example 6

This example discloses the use of fire retardants in the modified thermoplastic resins. Table I shows the formulations and Table II shows the results.

The method of testing that was used consisted of hanging a specimen bar about 8 inches above a piece of cotton wool. A hand held propane torch was used as the flame source and the flame was applied to the bottom part of the sample for 10 seconds. After 10 seconds, the flame was removed, and the sample was observed to determine if it sustained a flame. If it was burning, the time was observed before the flames extinguished. If the sample burned for more than 10 seconds, it was considered a failure. If the sample extinguished itself before 10 seconds, then the flame was reapplied to the sample for 10 additional seconds, and the observation and results was repeated. This process was repeated for a maximum of three 10 second burns. If during or after the flame is applied, the sample drips or separates away from the remainder of the hanging sample, the drip should not ignite the cotton. If it does ignite the cotton, it is considered a failure. After the three flame applications, and assuming the flame was extinguished each time, the samples were assessed for char formation. The assessment of char formation and density is a very subjective test, and comparative between the samples, and not against any standard. All samples that did not fail had substantial hard char formation.

It should be noted that this test is more severe than the UL94-5V burn rate test in that the flame used in that test is a Bunsen burner having a flame of approximately 5 inches and an inner core flame of 1½ inches while the propane torch of this test has a flame of approximately 2½ inches and an inner core flame of about ¾ of an inch, making the flame impact much hotter. Table III shows the results of the flame testing.

TABLE I

| Formulation Number | Crisil Sil Base/ 1% peroxide | % Xyron and type | % Nyad G | % FR* |
|---|---|---|---|---|
| 1 | 7.50% | 78.30-SA201A | 2.50 | 11.70% |
| 2 | 11.25% | 73.95-SA201A | 3.75 | 11.05% |
| 3 | 15.00% | 69.60-SA201A | 5.00 | 10.40% |
| 4 | 22.50% | 60.90-SA201A | 7.50 | 9.10% |
| 5 | 30.00% | 52.20-SA201A | 10.00 | 7.80% |
| 6 | 37.50% | 43.50-SA201A | 12.50 | 6.50% |
| 7 | 7.50% | 78.30-SA202A | 2.50 | 11.70% |
| 8 | 11.25% | 73.95-SA202A | 3.75 | 11.05% |
| 9 | 15.00% | 69.60-SA202A | 5.00 | 10.40% |
| 10 | 22.50% | 60.90-SA202A | 7.50 | 9.10% |
| 11 | 30.00% | 52.20-SA202A | 10.00 | 7.80% |
| 12 | 37.50% | 43.50-SA202A | 12.50 | 6.50% |

FR = Fire Retardant = NcendX P-30 flame retardant manufactured by Albemarle Corporation, Baton Rouge, Louisiana.

TABLE II

| Form No. | Stress at yield | Strain at yield | Stress at break | strain at break | Modulus Psi | Stress * Def. Psi | Impact |
|---|---|---|---|---|---|---|---|
| 1 | 10451 | 9.3 | 9866 | 12.6 | 349891 | 13289 | 1.11 |
| 2 | 9745 | 8.4 | 8968 | 7.6 | 342472 | 11614 | 1.45 |
| 3 | — | — | 6516 | 6.1 | 310457 | 10323 | 1.29 |
| 4 | 6299 | 8.3 | 6269 | 8.5 | 250807 | 8935 | 1.10 |
| 5 | 5708 | 7.8 | 5677 | 8.2 | 258293 | 439 | 1.26 |
| 6 | — | — | 4615 | 6.4 | 244432 | — | 1.08 |
| 7 | nd | nd | nd | nd | nd | nd | nd |
| 8 | nd | nd | nd | nd | nd | nd | nd |
| 9 | 9845 | 8.8 | 9795 | 8.9 | 351733 | — | .825 |
| 10 | 9069 | 8.6 | 9094 | 8.9 | 336088 | — | .860 |
| 11 | — | — | 4729 | 5.4 | 316464 | — | .948 |
| 12 | 6779 | 8.5 | 6699 | 8.4 | 283072 | — | .838 |
| 13 | — | — | 5436 | 7.3 | 264780 | — | .772 |
| 14 | — | — | 4320 | 5.9 | 235696 | — | .754 |

TABLE III

| Form No. | Time After 10 sec. Burn In Seconds | | |
|---|---|---|---|
| | 1st Burn | 2nd Burn | 3rd Burn |
| 1 | 1 | 3 | 2 |
| 2 | 1.5 | 3 | 2 |
| 3 | 2 | 3 | 3 |
| 4 | 2 | 3 | 4 |
| 5 | 2 | 3 | 3 |
| 6 | 2 | 3 | 4 |
| 9 | 1 | 3 | 2 |
| 10 | 1 | 3 | 2 |
| 11 | 2 | 3 | 3 |
| 12 | 2 | 3 | 4 |
| 13 | 2 | 3 | 4 |
| 14 | 2 | 3 | 3 |

What is claimed is:

1. A method for preparing a modified thermoplastic resin, said method comprising:
   (I) mixing
      (A) a thermoplastic resin having a $t_g$ of 95° C. or greater and having a melt processing temperature of 250° C. or greater;
      (B) a silicone base comprising:
         (i) 100 parts by weight of a diorganopolysiloxane gum having a plasticity of at least 30 and having an average of at least 2 alkenyl groups per molecule and
         (ii) 0 to 50 parts by weight of a reinforcing filler for every 100 parts of diorganopolysiloxane gum, wherein the weight ratio of said silicone base to said thermoplastic resin is from 0.5:99.5 to 85:15;
      (C) 0.01 to 5 parts by weight of a radical initiator for every 100 parts by weight of the silicone base, and
      (D) an adhesion additive, and
   (II) dynamically vulcanizing said silicone base at an elevated temperature, wherein the thermoplastic resin is selected from the group consisting of: Liquid Crystal Polymers, Polysulfone, Polyphenylsulfone, Polyethersulfone, Polyetherketone, Polyether-etherketone, Polyetherketoneketone, Polyethylenenaphthalate, Polyether-block-amide, Polyether-block-copolyamid, Polyether-block-copolymer, Polyester-block-ether, Polyester-block-copolymer, Polyphenylene ether, Polyphthalamide, Polyarylamid, Polyimide, Polyamideimide, Polyethernitrile, Polycyclohexylene-dimethylene terephthalate, clohexylenedimethylene terephthalate acid, and acrylonitrile styrene acrylate.

2. A method as claimed in claim 1 wherein the silicone base comprises 1 to 50 parts by weight of reinforcing filler for every 100 parts of diorganopolysiloxane gum.

3. A method as claimed in claim 1 wherein the silicone base comprises less than 1 part by weight of reinforcing filler for every 100 parts of diorganopolysiloxane gum.

4. A method as claimed in claim 1 wherein the thermoplastic resin is selected from the group consisting of thermoplastic resins having a $t_g$ of 110° C. or greater and a melt processing temperature of 250° C. or greater.

5. The method as claimed in claim 1 wherein the adhesion additive is present at 0.05 to 10 parts by weight based on the weight of the silicone base.

6. The method as claimed in claim 1 wherein the radical initiator is selected from the group consisting of: (i) 2,2'-azobisisobutyronitrile, (ii) 2,2'-azobis(2-methylbutyronitrile), (iii) dibenzoyl peroxide, (iv) tert-amyl peroxyacetate, (v) 1,4-di(2-tert-butylperoxyisoproyl)benzene, monohydroperoxide, (vi) cumyl hydroperoxide, (vii) tert-butyl hydroperoxide, (viii) tert-amyl hydroperoxide, (ix) 1,1-d(tert-butylperoxy)cyclohexane, (x) tert-butylperoxy isopropyl carbonate, (xi) tert-amyl peroxybenzoate, (xii) dicumyl peroxide, (xiii) 2,5-dimethyl-2,5-di-(tert-butylperoxy)hexane, (xiv) bis(1-methyl-1-phenylethyl)peroxide, (xv) 2,5-dimethyl-2,5-di-(tert-butylperoxy)hexyne-3, (xvi) di-tert-butyl peroxide, (xvii) α,α-dimethylbenzyl hydroperoxide, (xviii) 3,4-dimethyl-3,4-diphenylhexane, (xix) t-butyl hydroperoxide, (xx) t-butyl peroxy O-toluate, (xxi) cyclic peroxy ketal, (xxii) t-butyl peroxypivalate, (xxiii) lauroyl peroxide, (xxiv) t-amyl peroxy-2-ethylhexanoate, (xxv) vinyltris(t-butyl peroxy)silane, (xxvi) di-t-butylperoxide, (xxvii) 2,2,4-trimethylpentyl-2-hydroperoxide, (xxviii) 2,5-bis(t-butylperoxy)-2,5-dimethylhexyne-3, (xxix) t-butyl-peroxy-3,5,5-trimethylhexanoate, (xxx) cumene hydroperoxide, (xxxi) t-butyl peroxybenzoate, (xxxii) diisopropylbenzene mono hydroperoxide, and (xxxiii) combinations of (i) to (xxxii).

7. A modified thermoplastic resin prepared by the process as claimed in claim 1.

8. A modified thermoplastic resin prepared by the process as claimed in claim 1 wherein, in addition, there is also present a fire retardant additive.

9. A modified thermoplastic resin prepared by the process as claimed in claim 8 wherein the fire retardant additive is selected from the group consisting of polydibromostyrene, copolymers of dibromostyrene, polybromostyrene, brominated polystyrene, tetrabromophthalate esters, tetrabromophthalate diol, tetrabromophthalate anhydride, tetrabromobenzoate ester, hexabromocyclododecane, tetrabromobisphenol A, tetrabromobisphenol A bis(2,3-dibromopropyl ether), tetrabromobisphenol A bis(allyl ether), phenoxy-terminated carbonate oligomer of tetrabromobisphenol A, decabromodiphenylethane, decabromodiphenyl oxide, bis-(tribromophenoxyl)ethane, ethane-1,2-bis(pentabromophenyl), tetradecabromodiphenoxybenzene, ethylenebistetrabromophthalimide, ammonium bromide, poly pentabromobenzyl acrylate, brominated epoxy polymer, brominated epoxy oligomer, brominated epoxies, triaryl phosphates isopropylated, cresyl diphenyl phosphate, tricresyl phosphate, trixylxl phosphate, triphenylphosphate, triaryl phosphates butylated, resorcinol bis-(diphenyl phosphate), bisphenol A bis(diphenyl phosphate), melamine phosphate, melamine pyrophosphate, melamine polyphosphate, dimelamine phosphate, melamine, melamine cyanurate, magnesium hydroxide, antimony trioxide, red phosphorous, zinc borate, and zinc stanate.

10. A modified thermoplastic resin prepared by the process as claimed in claim 8 wherein the fire retardant additive is selected from non-halogenated fire retardants.

11. A modified thermoplastic resin prepared by the process as claimed in claim 8 wherein the fire retardant additive is selected from halogenated fire retardants.

12. A modified thermoplastic resin prepared by the process as claimed in claim 3 wherein, in addition, there is present a fire retardant additive.

13. A modified thermoplastic resin prepared by the process as claimed in claim 12 wherein the fire retardant additive is selected from the group consisting of polydibromostyrene, copolymers of dibromostyrene, polybromostyrene, brominated polystyrene, tetrabromophthalate esters, tetrabromophthalate diol, tetrabromophthalate anhydride, tetrabromobenzoate ester, hexabromocyclododecane, tetrabromobisphenol A, tetrabromobisphenol A bis(2,3-dibromopropyl ether), tetrabromobisphenol A bis(allyl ether), phenoxy-terminated carbonate oligomer of tetrabromobisphenol A, decabromodiphenylethane, decabromodiphenyl oxide, bis-(tribromophenoxyl)ethane, ethane-1,2-bis(pentabromophenyl), tetradecabromodiphenoxybenzene, ethylenebistetrabromophthalimide, ammonium bromide, poly pentabromobenzyl acrylate, brominated epoxy polymer, brominated epoxy oligomer, and brominated epoxies, triaryl phosphates isopropylated, cresyl diphenyl phosphate, tricresyl phosphate, trixylxl phosphate, triphenylphosphate, triaryl phosphates butylated, resorcinol bis-(diphenyl phosphate), bisphenol A bis(diphenyl phosphate), melamine phosphate, melamine pyrophosphate, melamine polyphosphate, dimelamine phosphate, melamine, melamine cyanurate, magnesium hydroxide, antimony trioxide, red phosphorous, zinc borate, and zinc stanate.

14. A modified thermoplastic resin as claimed in claim 13 wherein the fire retardant is non-halogenated.

15. A modified thermoplastic resin as claimed in claim 13 wherein the fire retardant is halogenated.

16. A modified thermoplastic resin as claimed in claim 7 after it has been vulcanized.

17. A modified thermoplastic resin as claimed in claim 8 after it has been vulcanized.

18. A modified thermoplastic resin as claimed in claim 12 after it has been vulcanized.

* * * * *